(12) United States Patent
Xie et al.

(10) Patent No.: US 11,617,098 B2
(45) Date of Patent: Mar. 28, 2023

(54) MEASUREMENT GAP CONFIGURATION METHOD AND DEVICE

(71) Applicants: China Mobile Communication Co., Ltd Research Institute, Beijing (CN); China Mobile Communications Group Co., Ltd., Beijing (CN)

(72) Inventors: Fang Xie, Beijing (CN); Jingjing Chen, Beijing (CN); Guangyi Liu, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 193 days.

(21) Appl. No.: 17/254,504

(22) PCT Filed: Jun. 21, 2019

(86) PCT No.: PCT/CN2019/092281
§ 371 (c)(1),
(2) Date: Dec. 21, 2020

(87) PCT Pub. No.: WO2019/242732
PCT Pub. Date: Dec. 26, 2019

(65) Prior Publication Data
US 2021/0136616 A1 May 6, 2021

(30) Foreign Application Priority Data
Jun. 21, 2018 (CN) .......................... 201810644192.8

(51) Int. Cl.
*H04W 24/10* (2009.01)
*H04W 76/15* (2018.01)
*H04W 84/18* (2009.01)

(52) U.S. Cl.
CPC .......... *H04W 24/10* (2013.01); *H04W 76/15* (2018.02); *H04W 84/18* (2013.01)

(58) Field of Classification Search
CPC ..... H04W 24/10; H04W 76/15; H04W 84/18; H04W 88/06; H04W 24/02; H04W 24/08; H04L 41/0803
See application file for complete search history.

(56) References Cited

U.S. PATENT DOCUMENTS

2015/0245235 A1  8/2015  Tang et al.
2017/0048108 A1  2/2017  Yi et al.
(Continued)

FOREIGN PATENT DOCUMENTS

| CN | 106233765 A | 12/2016 |
| CN | 106416350 A | 2/2017 |
| CN | 107040956 A | 8/2017 |

OTHER PUBLICATIONS

ZTE Corp., "Measurement and gap configuration framework in NE-DC", 3GPP TSG-RAN WG2 Meeting #102, R2-1807736, Busan, Korea, May 20-25, 2018.
(Continued)

*Primary Examiner* — Chuong A Ngo
(74) *Attorney, Agent, or Firm* — Price Heneveld LLP (57) ABSTRACT

A measurement gap configuration method and a device are provided. The method includes: sending, by a secondary node, first indication information or second indication information to a master node; receiving, by the master node, the first indication information or the second indication information sent by the secondary node, wherein the first indication information is used to indicate that the secondary node needs to configure a terminal to perform an E-UTRAN inter-frequency measurement, or is used to request the master node to configure a measurement gap, the second indication information is used to indicate that the secondary (Continued)

Sending, by a secondary node, first indication information to a master node, wherein the first indication information indicates that the secondary node needs to configure a terminal to perform an E-UTRAN inter-frequency measurement ─ 51 node does not need to configure a terminal to perform an E-UTRAN inter-frequency measurement, or is used for not requesting the master node to configure a measurement gap.

20 Claims, 4 Drawing Sheets

(56) References Cited

U.S. PATENT DOCUMENTS

2019/0281588 A1\* 9/2019 Zhang .................. H04L 5/0051
2020/0128453 A1\* 4/2020 Teyeb ............... H04W 36/0058

OTHER PUBLICATIONS

Nokia, "TP for Gap coordination assistance information", 3GPP TSG-RAN WG2 Meeting #101, R2-1803941, Athens, Greece, Feb. 26-Mar. 2, 2018.
Intel Corp., "Measurement gap capability information for NR SA", 3GPP TSG-RAN WG2 NR Ad hoc 0118, R2-1800910, Vancouver, Canada, Jan. 22-26, 2018.
Vivo, "Issues on measurement gap in EN-DC and NR", 3GPP TSG-RAN WG2 Meeting #100, R2-1712765, Reno, USA, Nov. 27-Dec. 1, 2017.
Nokia "Consideration on Measurement Gap in NE-DC", 3GPP TSG-RAN WG2 Meeting #102, May 21-25, 2018, Busan, South Korea.
Ericsson "NE-DE Measurement Principles", 3GPP TSG-RAN WG2 #102, May 21-25, 2018, Busan, Republic of Korea.

\* cited by examiner

Sending, by a secondary node, first indication information to a master node, wherein the first indication information indicates that the secondary node needs to configure a terminal to perform an E-UTRAN inter-frequency measurement — 51

Fig.5

Receiving, by a master node, first indication information sent by a secondary node, wherein the first indication information indicates that the secondary node needs to configure a terminal to perform an E-UTRAN inter-frequency measurement — 61

Fig.6

Receiving, by a master node, second indication information sent by a secondary node, wherein the second indication information indicates that the secondary node does not need to configure a terminal to perform an E-UTRAN inter-frequency measurement — 71

MEASUREMENT GAP CONFIGURATION METHOD AND DEVICE

CROSS-REFERENCE TO RELATED APPLICATION

This application is a U.S. national phase application of a PCT Application No. PCT/CN2019/092281 filed on Jun. 21, 2019, which claims a priority to the Chinese patent application No. 201810644192.8 filed in China on Jun. 21, 2018, a disclosure of which is incorporated herein by reference in its entirety.

TECHNICAL FIELD

The present disclosure relates to the field of communications technologies, and in particular, relates to a method and a device of configuring a measurement gap.

BACKGROUND

Figure 1:
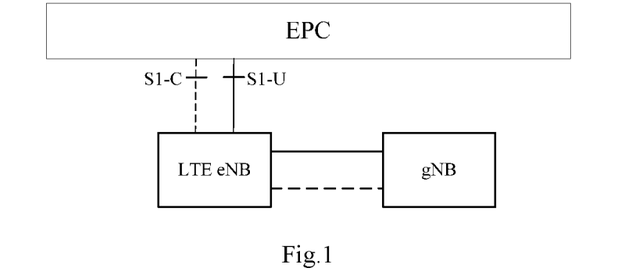
FIG. 1 shows a schematic diagram of an EN-DC scenario in the related art.
Figure 2:
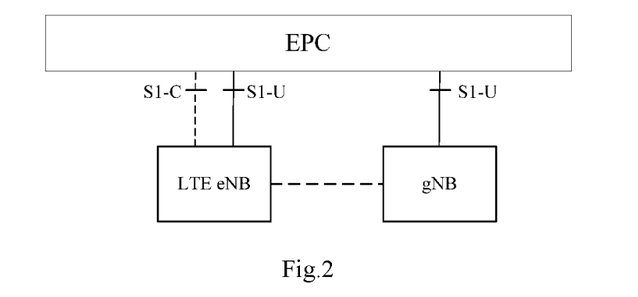
FIG. 2 shows another schematic diagram of an EN-DC scenario in the related art.

Referring to FIG. 1 and FIG. 2, in an Evolved-Universal Terrestrial Radio Access (E-UTRA)-New Radio (NR) Dual Connectivity (EN-DC) scenario, a Master Node (MN) is an Evolved Universal Terrestrial Radio Access Network (E-UTRAN) node eNB (i.e., LTE eNB), and a secondary node is a Radio Access Network (RAN) node gNB in a 5G new radio system.

A measurement gap configuration method in an EN-DC scenario includes the following: 1) for UEs that do not support per Frequency Range (FR) gap but only per UE gap, an MN configures a gap and notifies the gap to a terminal (UE); 2) for UEs that support per FR gap, if a Per UE gap is configured, then an MN (LTE eNB) configures the gap and notifies the UE that the gap is a Per UE gap; if a Per FR gap is configured, then the MN is responsible for configuring a gap of a frequency range 1 (FR1, below 6 GHz) of the NR system, and notifying the UE that the gap is for the FR1. In addition, an SN is responsible for configuring a gap of a frequency range 2 (FR2, above 6 GHz) of the NR system and sending the gap to the UE.

For a configuration of the per UE gap, the SN needs to report, to the MN, frequency information of the FR1 and the FR2 to be measured, so that the MN may configure a suitable gap pattern.

For a configuration of the per FR gap, since the SN (gNB) node may need to perform an inter-frequency measurement of the FR1, the SN needs to report, to the MN, FR1 frequency information to be measured in order to facilitate the MN to configure a gap pattern of the FR1; similarly, the MN sends, to the SN, FR2 frequency information to be measured, so that the SN may configure a gap pattern of the FR2.

Figure 3:
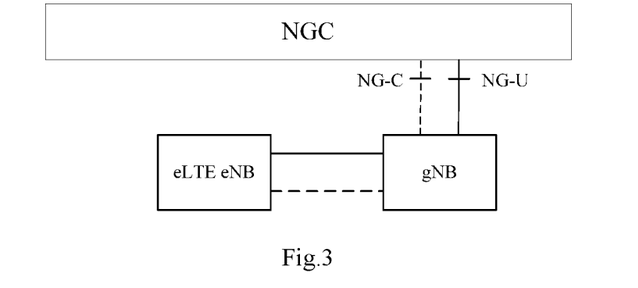
FIG. 3 shows a schematic diagram of a NE-DC scenario in the related art.
Figure 4:
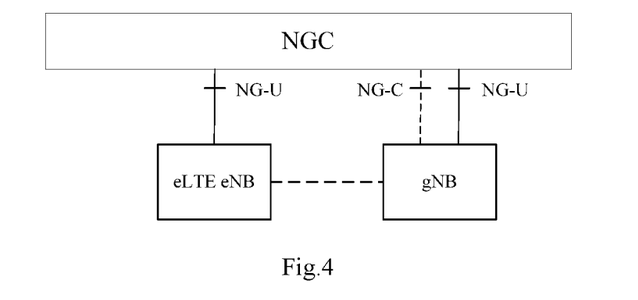
FIG. 4 shows another schematic diagram of a NE-DC scenario in the related art.

As shown in FIG. 3, and FIG. 4, in an NE-DC scenario, the MN is a gNB, and the secondary node is an eNB (i.e., LTE eNB). There is no clear solution for how to configure a measurement gap in the NE-DC scenario.

SUMMARY

Embodiments of the present disclosure provide a measurement gap configuration method and a device, and provide a measurement gap configuration scheme in an NE-DC scenario, so that a master node may configure a measurement gap more suitably.

To solve the above technical problem, the following solutions are provided in embodiments of the present disclosure:

A measurement gap configuration method is applied to a New radio-Evolved universal terrestrial radio access-Dual Connectivity (NE-DC) scenario, and the method includes: sending, by a secondary node, first indication information to a master node in a case that the terminal needs to be configured to perform the Evolved-Universal Terrestrial Radio Access Network (E-UTRAN) inter-frequency measurement, wherein the first indication information is used to indicate that the secondary node needs to configure the terminal to perform the E-UTRAN inter-frequency measurement, or is used to request the master node to configure the measurement gap.

An embodiment of the present disclosure further provides another measurement gap configuration method applied to a New radio-Evolved universal terrestrial radio access-Dual Connectivity (NE-DC) scenario, and the method includes: receiving, by a master node, first indication information sent by a secondary node, wherein the first indication information is used to indicate that the secondary node needs to configure a terminal to perform an Evolved-Universal Terrestrial Radio Access Network (E-UTRAN) inter-frequency measurement, or is used to request the master node to configure a measurement gap.

An embodiment of the present disclosure further provides another measurement gap configuration method applied to a New radio-Evolved universal terrestrial radio access-Dual Connectivity (NE-DC) scenario, and the method includes: receiving, by a master node, second indication information sent by a secondary node, wherein the second indication information is used to indicate that the secondary node does not need to configure a terminal to perform an Evolved-Universal Terrestrial Radio Access Network (E-UTRAN) inter-frequency measurement, or is used for not requesting the master node to configure a measurement gap.

An embodiment of the present disclosure further provides a secondary node in a New radio-Evolved universal terrestrial radio access-Dual Connectivity (NE-DC) scenario, wherein the secondary node includes a processor and a transceiver. The processor is used to determine that a terminal needs to be configured to perform an Evolved-Universal Terrestrial Radio Access Network (E-UTRAN) inter-frequency measurement, so that a measurement gap needs to be configured; the transceiver is used to send first indication information to a master node in a case that the terminal needs to be configured to perform the Evolved-Universal Terrestrial Radio Access Network (E-UTRAN) inter-frequency measurement, wherein the first indication information is used to indicate that the secondary node needs to configure the terminal to perform the E-UTRAN inter-frequency measurement, or is used to request the master node to configure the measurement gap.

An embodiment of the present disclosure further provides a master node in a New radio-Evolved universal terrestrial radio access-Dual Connectivity (NE-DC) scenario, and the master node includes a processor and a transceiver. The transceiver is used to receive first indication information sent by a secondary node, wherein the first indication information is used to indicate that the secondary node needs to configure a terminal to perform an Evolved-Universal Terrestrial Radio Access Network (E-UTRAN) inter-frequency measurement, or is used to request the master node to configure a measurement gap.

An embodiment of the present disclosure further provides another master node in a New radio-Evolved universal terrestrial radio access-Dual Connectivity (NE-DC) scenario, and the master node includes a processor and a transceiver. The transceiver is used to receive second indication information sent by a secondary node, wherein the second indication information is used to indicate that the secondary node does not need to configure a terminal to perform an Evolved-Universal Terrestrial Radio Access Network (E-UTRAN) inter-frequency measurement, or is used for not requesting the master node to configure a measurement gap.

An embodiment of the present disclosure further provides a communication device including: a processor, a storage storing thereon a computer program, wherein when the computer program is executed by the processor, the processor implements the method as described above.

An embodiment of the present disclosure further provides a computer readable storage medium including an instruction, wherein when the instruction is executed on a computer, the computer is caused to implement the method as described above.

Beneficial effects of the above technical solutions of embodiments of the present disclosure are as follows. In embodiments of the present disclosure, a master node may be indicated by a secondary node in a case that the secondary node needs to configure a terminal to perform an LTE system inter-frequency measurement, and further needs to configure a measurement gap for the terminal. In this way, when configuring a measurement gap for the terminal, the master node configures an appropriate measurement gap pattern according to the indication of the secondary node. In addition, embodiments of the present disclosure may use 1-bit indication information for information indication, thereby reducing a signaling overhead between nodes.

BRIEF DESCRIPTION OF THE DRAWINGS

In order to more clearly illustrate technical solutions in embodiments of the present disclosure, drawings used in the description of the embodiments of the present disclosure will be briefly introduced below. Obviously, the drawings in the following description are only some embodiments of the present disclosure. Based on these drawings, other drawings may be obtained by a person of ordinary skills in the art without paying any creative work.

DETAILED DESCRIPTION

Exemplary embodiments of the present disclosure will be described in more detail below with reference to the accompanying drawings. Although exemplary embodiments of the present disclosure are shown in the drawings, it should be understood that the present disclosure may be implemented in various forms, without being limited by the embodiments described herein. Rather, these embodiments are provided so that the present disclosure will be thorough and complete, and will fully convey the scope of the present disclosure to those skilled in the art.

The terms "first", "second" and the like in the specification and claims of the present application are used to distinguish similar objects, and are not necessarily used to describe a particular order or chronological order. It is to be understood that the data so used may be interchangeable under appropriate circumstances, so that embodiments of the present application described herein may be implemented in a sequence other than those illustrated or described herein. In addition, such terms as "comprise", "have" and any variants thereof are intended to cover non-exclusive inclusions, for example, a process, a method, a system, a product, or a device that includes a series of steps or units is not necessarily limited to those steps or units clearly listed, but may include other steps or units not explicitly listed or inherent to such processes, methods, products or devices. The term "and/or" in the specification and claims indicates at least one of objects connected by the term.

The technology described herein is not limited to a Long Time Evolution (LTE)/LTE-Advanced (LTE-A) system, and may also be used in various wireless communication systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA) and other systems. The terms "system" and "network" are often used interchangeably. The CDMA systems may implement radio technologies such as CDMA2000 and Universal Terrestrial Radio Access (UTRA). The UTRA includes Wideband Code Division Multiple Access (WCDMA) and other CDMA variants. TDMA systems may implement radio technologies such as Global System for Mobile Communication (GSM). OFDM systems may implement radio technologies such as Ultra Mobile Broadband (UMB), Evolution-UTRA (E-UTRA), IEEE 802.11 (Wi-Fi), IEEE 802.16 (WiMAX), IEEE 802.20, and Flash-OFDM. The UTRA and the E-UTRA are part of a Universal Mobile Telecommunications System (UMTS). The LTE and more advanced LTE (such as LTE-A) are new UMTS versions that use the E-UTRA. The UTRA, the E-UTRA, the UMTS, the LTE, the LTE-A, and the GSM are described in documents from an organization named "3rd Generation Partnership Project" (3GPP). The CDMA2000 and the UMB are described in documents from an organization named "3rd Generation Partnership Project 2" (3GPP2). The technologies described herein may be used for the systems and radio technologies mentioned above, as well as other systems and radio technologies. However, the following description describes an LTE system and an NR system for exemplary purposes, and LTE and NR terminology is used in most of the description below, although these technologies may also be applied to applications other than LTE and NR system applications.

The following description provides examples and does not limit the scope, applicability, or configuration set forth in the claims. Changes may be made to functions and arrangements of the discussed elements without departing from spirit and scope of the present disclosure. Various examples may omit, substitute, or add various procedures or components as appropriate. For example, the described method may be performed in an order different from that described, and various steps may be added, omitted, or combined. In addition, features described with reference to certain examples may be combined in other examples.

In an NE-DC scenario, a master node is a radio access network (RAN) node gNB of a 5G system, and a secondary node is an E-UTRAN node eNB. The secondary node may configure a terminal to perform an E-UTRAN inter-frequency measurement. The master node may configure the terminal to perform an inter-frequency measurement on NR frequencies (including FR1 and/or FR2), and may also configure the terminal to perform an inter-frequency measurement on LTE frequencies.

In the NE-DC scenario, since the MN becomes a gNB, an inter-frequency measurement configured by the gNB may be a LTE frequency, an FR1 or FR2 frequency of the NR system, while an inter-frequency measurement configured by the LTE could only be a LTE frequency. Therefore, a possible measurement gap configuration scheme is that a MN (gNB) configures all measurement gap schemes, including a per UE measurement gap and a per FR measurement gap.

Table 1 shows applicable scenarios where 24 measurement gap patterns currently supported by the NR system are applied to. Regardless of configurations of the per UE gap or the per FR gap, in a dual-connection scenario, as long as LTE (E-UTRA) appears in a measurement purpose, a measurement gap pattern configured to the UE could only be with pattern IDs 0 to 3. Based on the above analysis, it may be seen that, for the SN, information of specific frequency or frequencies to be measured may not be notified to the MN, however, the MN is needed to be notified through an indication, such as 1-bit indication information, that an inter-frequency measurement also needs to be configured to UE by the SN (i.e., LTE eNB). In this way, the MN may configure an appropriate measurement gap pattern for the terminal.

TABLE 1

| Measurement gap pattern configuration | Serving cell | Measurement Purpose | Applicable Gap Pattern Id |
|---|---|---|---|
| Per-UE measurement gap | E-UTRA only, or E-UTRA and FR1, or E-UTRA and FR2, or E-UTRA and FR1 and FR2 | E-UTRA only FR1 and/or FR2 E-UTRA and FR1 and/or FR2 | [0, 1, 2, 3] [0-11] [0, 1, 2, 3] |

TABLE 1-continued

| Measurement gap pattern configuration | Serving cell | Measurement Purpose | Applicable Gap Pattern Id |
|---|---|---|---|
| Per FR measurement gap | E-UTRA and, FR1 if configured FR2, if configured | E-UTRA only | [0, 1, 2, 3] No gap |
| | E-UTRA and, FR1 if configured FR2, if configured | FR1 only | [0-11] No gap |
| | E-UTRA and, FR1 if configured FR2, if configured | FR2 only | No gap [12-23] |
| | E-UTRA and, FR1 if configured FR2, if configured | E-UTRA and FR1 | [0, 1, 2, 3] No gap |
| | E-UTRA and, FR1 if configured FR2, if configured | FR1 and FR2 | [0-11] [12-23] |
| | E-UTRA and, FR1 if configured FR2, if configured | E-UTRA and FR2 | [0, 1, 2, 3] [12-23] |
| | E-UTRA and, FR1 if configured FR2, if configured | E-UTRA and FR1 and FR2 | [0, 1, 2, 3] [12-23] |

Figure 5:
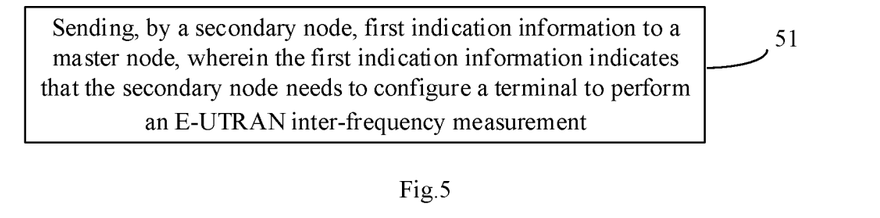
FIG. 5 is a schematic flowchart of a measurement gap configuration method provided in an embodiment of the present disclosure.

Referring to FIG. 5, an embodiment of the present disclosure provides a measurement gap configuration method applied to a secondary node in an NE-DC scenario. As shown in FIG. 5, the method includes Step 51.

Step 51: sending, by a secondary node, first indication information to a master node, wherein the first indication information is used to indicate that the secondary node needs to configure a terminal to perform an E-UTRAN inter-frequency measurement, or is used to request the master node to configure a measurement gap.

Here, the secondary node sends the first indication information to the master node in a case that the terminal needs to be configured to perform the E-UTRAN inter-frequency measurement and further a measurement gap needs to be configured for the terminal. In order to save a signaling overhead between nodes, the first indication information may be indicated by a predetermined 1-bit, for example, the first indication information indicates that the secondary node needs to configure the terminal to perform the E-UTRAN inter-frequency measurement in a case that a value of the 1-bit is 0, or, the first indication information indicates that the secondary node needs to configure the terminal to perform the E-UTRAN inter-frequency measurement in a case that a value of the 1-bit is 1.

Requesting the master node to configure a measurement gap may be caused by a condition that the secondary node needs to configure the terminal to perform the E-UTRAN inter-frequency measurement. Under the condition, the secondary node sends the first indication information to the master node, to request the master node to configure a measurement gap.

Specifically, the secondary node may send the first indication information to the master node through an inter-node interface Xn. The first indication information may be carried in an SCG configuration message (SCG-Config) or a CG configuration message (CG-Config) or other specifically defined messages for transmission.

Through the above step, in embodiments of the present disclosure, a master node may receive an indication from the secondary node in a case that the secondary node needs to configure a terminal to perform an LTE system inter-frequency measurement and further needs to configure a measurement gap for the terminal. In this way, when configuring a measurement gap for the terminal, the master node configures an appropriate measurement gap pattern according to the indication of the secondary node. For example, the measurement gap pattern is configured to be one of measurement gap patterns with IDs 0 to 3.

Optionally, in the method of the embodiment of the present disclosure, the secondary node may also send second indication information to the master node in a case that the secondary node does not need to configure the terminal to perform the Evolved-Universal Terrestrial Radio Access Network (E-UTRAN) inter-frequency measurement, wherein the second indication information is used to indicate that the secondary node does not need to configure the terminal to perform the E-UTRAN inter-frequency measurement, or is used for not requesting the master node to configure the measurement gap. Here, the second indication information may also be indicated by 1 bit of the first indication information, wherein, the second indication information indicates that the secondary node does not need to configure the terminal to perform the E-UTRAN inter-frequency measurement in a case that a value of the 1-bit is 1; or, the second indication information indicates that the secondary node does not need to configure the terminal to perform the E-UTRAN inter-frequency measurement in a case that a value of the 1-bit is 0.

Not requesting the master node to configure a measurement gap may be caused by a condition that the secondary node does not need to configure the terminal to perform the E-UTRAN inter-frequency measurement. Under the condition, the secondary node sends the second indication information to the master node, for not requesting the master node to configure a measurement gap.

Of course, in an embodiment of the present disclosure, the secondary node may also abstain from sending the second indication information to the master node in a case that the secondary node does not need to configure the terminal to perform the E-UTRAN inter-frequency measurement, that is, an indication about whether the secondary node needs to configure the E-UTRAN inter-frequency measurement is not sent. In this case, the master node may decide by itself how to configure a measurement gap pattern of the terminal. Through the above processing, a signaling overhead between nodes may be reduced.

Figure 6:
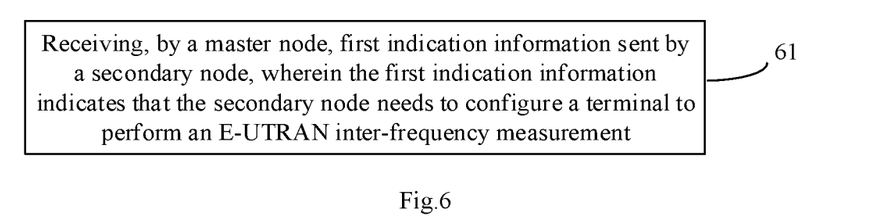
FIG. 6 is another schematic flowchart of a measurement gap configuration method provided in an embodiment of the present disclosure.

A measurement gap configuration method in an embodiment of the present disclosure is described above from a secondary-node side, and a measurement gap configuration method will be further described from a master-node side with reference to FIG. 6.

Referring to FIG. 6, an embodiment of the present disclosure provides a measurement gap configuration method applied to a master node in a NE-DC scenario. The method specifically includes Step 61.

Step 61: receiving, by a master node, first indication information sent by a secondary node, wherein the first indication information is used to indicate that the secondary node needs to configure a terminal to perform an Evolved-Universal Terrestrial Radio Access Network (E-UTRAN) inter-frequency measurement, or is used to request the master node to configure a measurement gap.

Here, the first indication information is indicated by a predetermined 1-bit, wherein, the first indication information indicates that the secondary node needs to configure the terminal to perform the E-UTRAN inter-frequency measurement in a case that a value of the 1-bit is 0, or, the first indication information indicates that the secondary node needs to configure the terminal to perform the E-UTRAN inter-frequency measurement in a case that a value of the 1-bit is 1.

Requesting the master node to configure a measurement gap may be caused by a condition that the secondary node needs to configure the terminal to perform the E-UTRAN inter-frequency measurement. Under the condition, the secondary node sends the first indication information to the master node, to request the master node to configure a measurement gap.

Through the above step, the master node may obtain the indication information of an inter-frequency measurement configuration of the secondary node, and accordingly configure an appropriate measurement gap pattern for the terminal. For example, the measurement gap pattern is configured to be one of measurement gap patterns with IDs 0 to 3.

Optionally, after Step 61, the method may also include: configuring, by the master node according to the first indication information, a measurement gap pattern of the terminal to be one of measurement gap patterns with identities 0 to 3.

Figure 7:
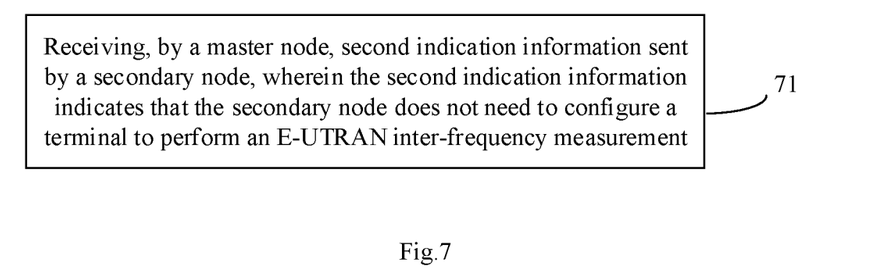
FIG. 7 is yet another schematic flowchart of a measurement gap configuration method provided in an embodiment of the present disclosure.

Referring to FIG. 7, an embodiment of the present disclosure provides another measurement gap configuration method applied to a master node in a NE-DC scenario. The method specifically includes Step 71.

Step 71: receiving, by a master node, second indication information sent by a secondary node, wherein the second indication information is used to indicate that the secondary node does not need to configure a terminal to perform an E-UTRAN inter-frequency measurement, or is used for not requesting the master node to configure a measurement gap.

Here, the second indication information is indicated by the 1-bit, wherein, the second indication information indicates that the secondary node does not need to configure the terminal to perform the E-UTRAN inter-frequency measurement in a case that a value of the 1-bit is 1; or, the second indication information indicates that the secondary node does not need to configure the terminal to perform the E-UTRAN inter-frequency measurement in a case that a value of the 1-bit is 1.

Not requesting the master node to configure a measurement gap may be caused by a condition that the secondary node does not need to configure the terminal to perform the E-UTRAN inter-frequency measurement. Under the condition, the secondary node sends the second indication information to the master node, for not requesting the master node to configure a measurement gap.

Through the above steps, the master node may obtain the indication information of an inter-frequency measurement configuration of the secondary node, and accordingly configure an appropriate measurement gap pattern for the terminal. For example, the measurement gap pattern is configured to be one measurement gap pattern of measurement gap patterns with IDs 0 to 23.

Optionally, subsequent to Step 71, the method may also include: configuring, by the master node, a measurement gap pattern of the terminal according to whether the master node needs to configure the terminal to perform the E-UTRAN inter-frequency measurement, wherein, the measurement gap pattern of the terminal is configured to be one of measurement gap patterns with identities 0 to 3 in a case that the master node needs to configure the terminal to perform the E-UTRAN inter-frequency measurement, and further needs to configure the measure gap for the terminal.

Measurement gap configuration methods in an embodiment of the present disclosure are described above from a secondary-node side and a master-node side respectively. A secondary node and a master node implementing the above methods will be further provided in the following.

Figure 8:
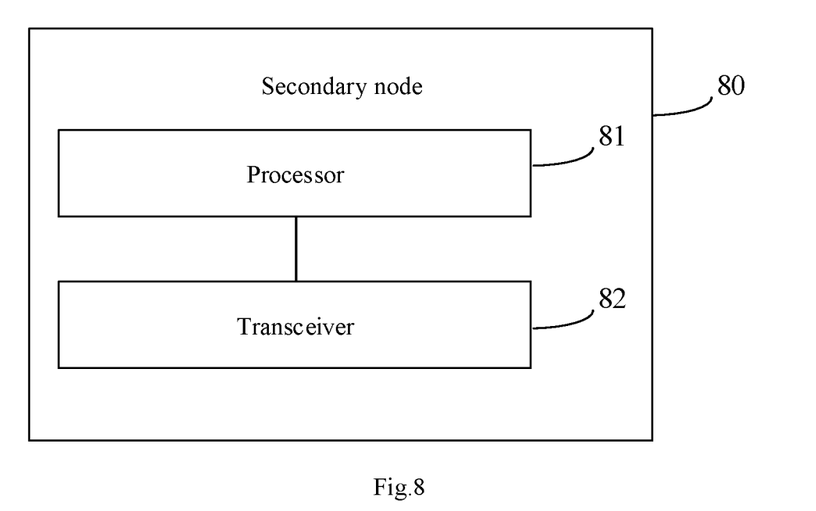
FIG. 8 is a schematic structural diagram of a secondary node provided in an embodiment of the present disclosure.

Referring to FIG. 8, an embodiment of the present disclosure further provides a secondary node 80 in a NE-DC scenario, and the secondary node may be an eNB, and the secondary node includes: a processor 81 and a transceiver 82.

The processor 81 is used to determine that a terminal needs to be configured to perform an Evolved-Universal Terrestrial Radio Access Network (E-UTRAN) inter-frequency measurement, so that a measurement gap needs to be configured.

The transceiver 82 is used to send first indication information to a master node in a case that the terminal needs to be configured to perform the Evolved-Universal Terrestrial Radio Access Network (E-UTRAN) inter-frequency measurement, wherein the first indication information is used to indicate that the secondary node needs to configure the terminal to perform the E-UTRAN inter-frequency measurement, or is used to request the master node to configure the measurement gap.

Requesting the master node to configure a measurement gap may be caused by a condition that the secondary node needs to configure the terminal to perform the E-UTRAN inter-frequency measurement. Under the condition, the secondary node sends the first indication information to the master node, to request the master node to configure a measurement gap.

The secondary node in the embodiment of the present disclosure may implement various processes in the corresponding method embodiment applied to the secondary node, and achieve the same beneficial effects. To avoid repetition, details thereof are not described here.

Here, the first indication information is indicated by a predetermined 1-bit, wherein, the first indication information indicates that the secondary node needs to configure the terminal to perform the E-UTRAN inter-frequency measurement in a case that a value of the 1-bit is 0, or, the first indication information indicates that the secondary node needs to configure the terminal to perform the E-UTRAN inter-frequency measurement in a case that a value of the 1-bit is 1.

Optionally, the transceiver 82 is further configured to send second indication information to the master node, or, abstain from sending the second indication information to the master node, in a case that the terminal does not need to be configured to perform the E-UTRAN inter-frequency measurement, wherein the second indication information is used to indicate that the secondary node does not need to configure the terminal to perform the E-UTRAN inter-frequency measurement, or used to not request the master node to configure a measurement gap.

Here, the second indication information is indicated by the 1-bit, wherein, the second indication information indicates that the secondary node does not need to configure the terminal to perform the E-UTRAN inter-frequency measurement in a case that a value of the 1-bit is 1; or, the second indication information indicates that the secondary node does not need to configure the terminal to perform the E-UTRAN inter-frequency measurement in a case that a value of the 1-bit is 0.

Not requesting the master node to configure a measurement gap may be caused by a condition that the secondary node does not need to configure the terminal to perform the E-UTRAN inter-frequency measurement. Under the condition, the secondary node sends the second indication information to the master node, for not requesting the master node to configure a measurement gap.

Here, the secondary node is a RAN node gNB of the 5G system, and the master node is an E-UTRAN node eNB.

Figure 9:
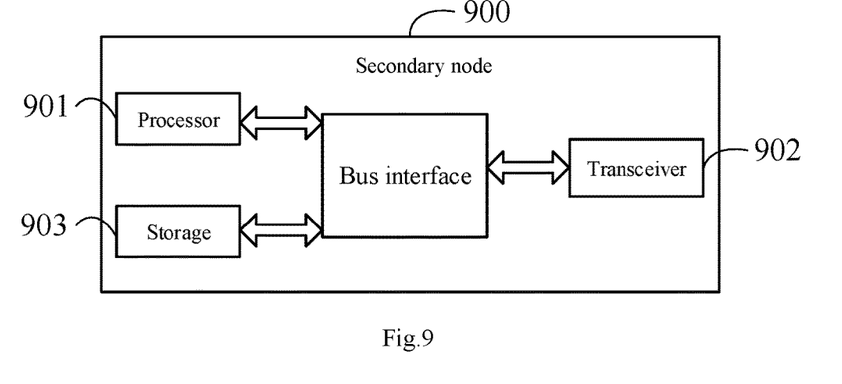
FIG. 9 is another schematic structural diagram of a secondary node provided in an embodiment of the present disclosure.

Referring to FIG. 9, an embodiment of the present disclosure further provides another secondary node, and the secondary node may be an eNB. As shown in FIG. 9, the secondary node includes: a processor 901, a transceiver 902, a storage 903, and a bus interface.

In an embodiment of the present disclosure, the secondary node 900 further includes: a computer program stored in the storage 903 and executable by the processor 901. The computer program is executed by the processor 901 to implement the following steps: sending first indication information to a master node in a case that the terminal needs to be configured to perform the Evolved-Universal Terrestrial Radio Access Network (E-UTRAN) inter-frequency measurement, wherein the first indication information is used to indicate that the secondary node needs to configure the terminal to perform the E-UTRAN inter-frequency measurement, or is used to request the master node to configure the measurement gap.

Requesting the master node to configure a measurement gap may be caused by a condition that the secondary node needs to configure the terminal to perform the E-UTRAN inter-frequency measurement. Under the condition, the secondary node sends the first indication information to the master node, to request the master node to configure a measurement gap.

In FIG. 9, a bus architecture may include any number of interconnected buses and bridges. Various circuits, specifically, one or more processors represented by the processor 901 and a storage represented by the storage 903, are linked together. The bus architecture may also link various other circuits such as peripherals, voltage regulators and power management circuits, which are well known in the art, and therefore a further description is omitted herein. The bus interface provides interfaces. The transceiver 902 may be a plurality of elements, that is, includes a transmitter and a receiver, to provide units configured to communicate with various other apparatuses over a transmission medium.

The processor 901 is responsible for managing the bus architecture and general processing, and the storage 903 may store data used by the processor 901 when performing operations.

Here, the first indication information is indicated by a predetermined 1-bit, wherein, the first indication information indicates that the secondary node needs to configure the terminal to perform the E-UTRAN inter-frequency measurement in a case that a value of the 1-bit is 0, or, the first indication information indicates that the secondary node needs to configure the terminal to perform the E-UTRAN inter-frequency measurement in a case that a value of the 1-bit is 1.

Optionally, the computer program is executed by the processor 903, the processor 903 may implement the following step: sending second indication information to a master node in a case that the terminal does not need to be configured to perform the E-UTRAN inter-frequency measurement, wherein the second indication information is used to indicate that the secondary node does not need to configure the terminal to perform the E-UTRAN inter-frequency measurement, or is used for not requesting the master node to configure the measurement gap.

Here, the second indication information is indicated by the 1-bit, wherein, the second indication information indicates that the secondary node does not need to configure the terminal to perform the E-UTRAN inter-frequency measurement in a case that a value of the 1-bit is 1; or, the second indication information indicates that the secondary node does not need to configure the terminal to perform the E-UTRAN inter-frequency measurement in a case that a value of the 1-bit is 0.

Here, the secondary node is an E-UTRAN node eNB, the master node is a radio access network (RAN) node gNB of the 5G system.

Not requesting the master node to configure a measurement gap may be caused by a condition that the secondary node does not need to configure the terminal to perform the E-UTRAN inter-frequency measurement. Under the condition, the secondary node sends the second indication information to the master node, for not requesting the master node to configure a measurement gap.

Figure 10:
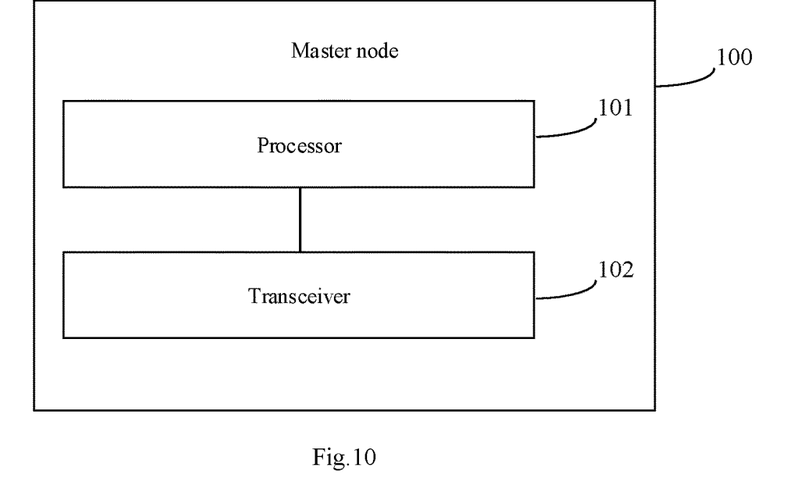
FIG. 10 is a schematic structural diagram of a master node provided in an embodiment of the present disclosure.

Referring to FIG. 10, an embodiment of the present disclosure further provides a master node 100 in a NE-DC scenario. The master node may be a gNB, and the master node includes: a processor 101 and a transceiver 102.

The transceiver is used to receive first indication information sent by a secondary node, wherein the first indication information is used to indicate that the secondary node needs to configure a terminal to perform an Evolved-Universal Terrestrial Radio Access Network (E-UTRAN) inter-frequency measurement, or is used to request the master node to configure a measurement gap.

Requesting the master node to configure a measurement gap may be caused by a condition that the secondary node needs to configure the terminal to perform the E-UTRAN inter-frequency measurement. Under the condition, the secondary node sends the first indication information to the master node, to request the master node to configure a measurement gap.

The master node in the embodiment of the present disclosure may implement various processes in the corresponding method embodiment applied to the master node, and achieve the same beneficial effects. To avoid repetition, details thereof are not described here.

Here, the first indication information is indicated by a predetermined 1-bit, wherein, the first indication information indicates that the secondary node needs to configure the terminal to perform the E-UTRAN inter-frequency measurement in a case that a value of the 1-bit is 0, or, the first indication information indicates that the secondary node needs to configure the terminal to perform the E-UTRAN inter-frequency measurement in a case that a value of the 1-bit is 1.

Here, the processor 101 may be used to configure, by the master node according to the first indication information, a measurement gap pattern of the terminal to be one of measurement gap patterns with identities 0 to 3.

Figure 11:
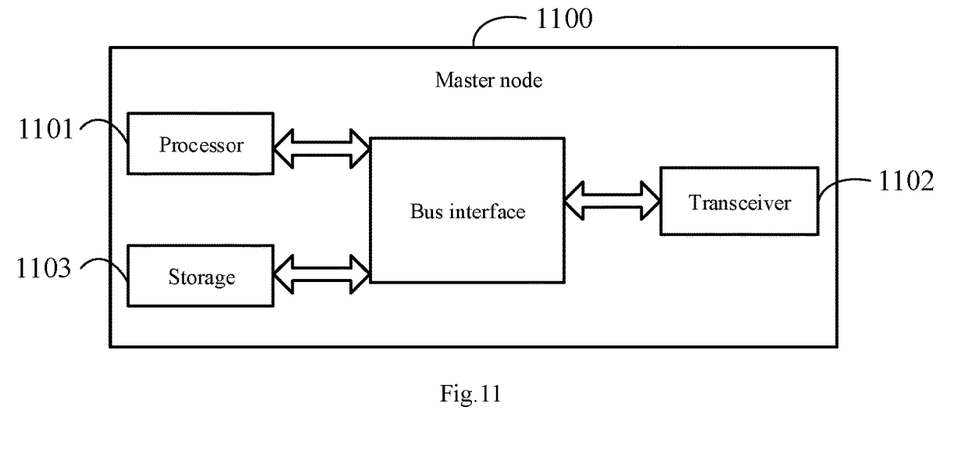
FIG. 11 is another schematic structural diagram of a master node provided in an embodiment of the present disclosure.

Referring to FIG. 11, an embodiment of the present disclosure further provides another master node, and the master node may be a gNB. As shown in FIG. 11, the master node includes: a processor 1101, a transceiver 1102, a storage 1103, and a bus interface.

In an embodiment of the present disclosure, the master node 1100 further includes: a computer program stored on the storage 1103 and executable by the processor 1101. When the computer program is executed by the processor 1101, the processor 1101 implements the following step: receiving first indication information sent by a secondary node, wherein the first indication information is used to indicate that the secondary node needs to configure a terminal to perform an Evolved-Universal Terrestrial Radio Access Network (E-UTRAN) inter-frequency measurement, or is used to request the master node to configure a measurement gap.

Requesting the master node to configure a measurement gap may be caused by a condition that the secondary node needs to configure the terminal to perform the E-UTRAN inter-frequency measurement. Under the condition, the secondary node sends the first indication information to the master node, to request the master node to configure a measurement gap.

In FIG. 11, a bus architecture may include any number of interconnected buses and bridges. Various circuits, specifically, one or more processors represented by the processor 1101 and a storage represented by the storage 1103, are linked together. The bus architecture may also link various other circuits such as peripherals, voltage regulators and power management circuits, which are well known in the art, and therefore a further description thereof is omitted herein. The bus interface provides interfaces. The transceiver 1102 may be a plurality of elements, that is, includes a transmitter and a receiver, to provide units configured to communicate with various other devices over a transmission medium.

The processor 1101 is responsible for managing the bus architecture and general processing, and the storage 1103 may store data used by the processor 1101 when performing operations.

Here, the first indication information is indicated by a predetermined 1-bit, wherein, the first indication information indicates that the secondary node needs to configure the terminal to perform the E-UTRAN inter-frequency measurement in a case that a value of the 1-bit is 0, or, the first indication information indicates that the secondary node needs to configure the terminal to perform the E-UTRAN inter-frequency measurement in a case that a value of the 1-bit is 1.

Optionally, when the computer program is executed by the processor 1103, the processor 1103 may implement the following step: configuring, according to the first indication information, a measurement gap pattern of the terminal to be one of measurement gap patterns with identities 0 to 3.

Figure 12:
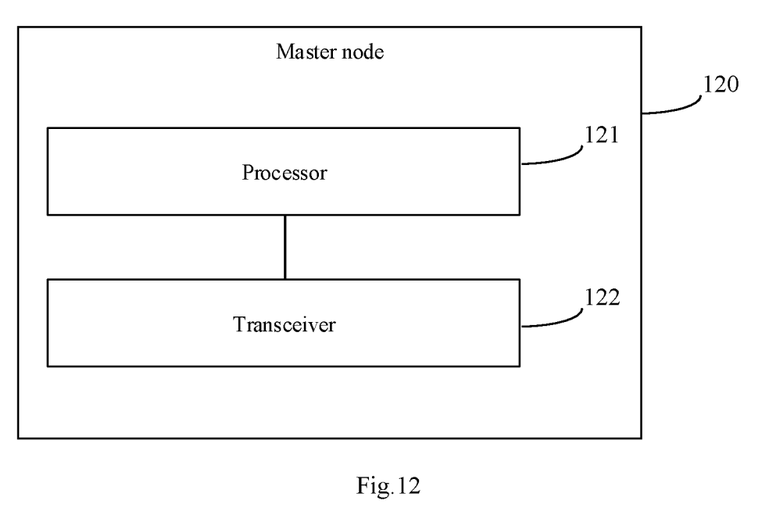
FIG. 12 is yet another schematic structural diagram of a master node provided in an embodiment of the present disclosure.

Referring to FIG. 12, an embodiment of the present disclosure further provides a master node 120 in a NE-DC scenario. The master node may specifically be a gNB, and the master node includes: a processor 121 and a transceiver 122.

The transceiver 122 is used to receive second indication information sent by a secondary node, wherein the second indication information is used to indicate that the secondary node does not need to configure a terminal to perform an Evolved-Universal Terrestrial Radio Access Network (E-UTRAN) inter-frequency measurement, or is used for not requesting the master node to configure a measurement gap.

Not requesting the master node to configure a measurement gap may be caused by a condition that the secondary node does not need to configure the terminal to perform the E-UTRAN inter-frequency measurement. Under the condition, the secondary node sends the second indication information to the master node, for not requesting the master node to configure a measurement gap.

The secondary node in the embodiment of the present disclosure may implement various processes in the corresponding method embodiment applied to the master node, and achieve the same beneficial effects. To avoid repetition, details thereof are not described here.

Here, the second indication information is indicated by the 1-bit, wherein, the second indication information indicates that the secondary node does not need to configure the terminal to perform the E-UTRAN inter-frequency measurement in a case that a value of the 1-bit is 1; or, the second indication information indicates that the secondary node does not need to configure the terminal to perform the E-UTRAN inter-frequency measurement in a case that a value of the 1-bit is 0.

Optionally, the processor 121 may be used to configure a measurement gap pattern of the terminal according to whether the master node needs to configure the terminal to perform the inter-frequency measurement of the Evolved-Universal Terrestrial Radio Access Network (E-UTRAN), wherein, the measurement gap pattern of the terminal is configured to be one of measurement gap pattern identities 0 to 3 in a case that the master node needs to configure the terminal to perform the E-UTRAN inter-frequency measurement, and further needs to configure a measure gap for the terminal.

Here, the master node is a RAN node gNB of the 5G system, and the secondary node is an E-UTRAN node eNB.

Figure 13:
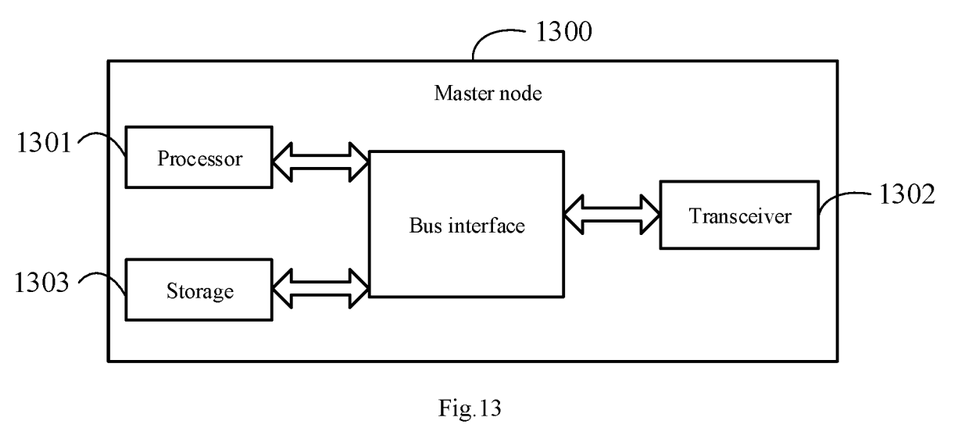
FIG. 13 is a further schematic structural diagram of a master node provided in an embodiment of the present disclosure.

Referring to FIG. 13, an embodiment of the present disclosure further provides another master node, and the master node may be a gNB. As shown in FIG. 13, the master node includes: a processor 1301, a transceiver 1302, a storage 1303, and a bus interface.

In an embodiment of the present disclosure, the master node 1300 further includes: a computer program stored on the storage 1303 and executable by the processor 1301. The computer program is executed by the processor 1301 to implement the following steps: receiving second indication information sent by a secondary node, wherein the second indication information is used to indicate that the secondary node does not need to configure a terminal to perform an inter-frequency measurement of an Evolved-Universal Terrestrial Radio Access Network (E-UTRAN), or is used for not requesting the master node to configure a measurement gap.

Not requesting the master node to configure a measurement gap may be caused by a condition that the secondary node does not need to configure the terminal to perform the E-UTRAN inter-frequency measurement. Under the condition, the secondary node sends the second indication information to the master node, for not requesting the master node to configure a measurement gap.

In FIG. 13, a bus architecture may include any number of interconnected buses and bridges. Various circuits, specifically, one or more processors represented by the processor 1301 and a storage represented by the storage 1303, are linked together. The bus architecture may also link various other circuits such as peripherals, voltage regulators and power management circuits, which are well known in the art, and therefore a further description is omitted herein. The bus interface provides interfaces. The transceiver 1302 may be a plurality of elements, that is, includes a transmitter and a receiver, to provide units configured to communicate with various other apparatuses over a transmission medium.

The processor 1301 is responsible for managing the bus architecture and general processing, and the storage 1303 may store data used by the processor 1301 when performing operations.

Here, the second indication information is indicated by the 1-bit, wherein, the second indication information indicates that the secondary node does not need to configure the terminal to perform the E-UTRAN inter-frequency measurement in a case that a value of the 1-bit is 1; or, the second indication information indicates that the secondary node does not need to configure the terminal to perform the E-UTRAN inter-frequency measurement in a case that a value of the 1-bit is 0.

Optionally, when the computer program is executed by the processor 1303, the processor 1303 may implement the following step: configuring a measurement gap pattern of the terminal according to whether the master node needs to configure the terminal to perform the inter-frequency measurement of the Evolved-Universal Terrestrial Radio Access Network (E-UTRAN), wherein, the measurement gap pattern of the terminal is configured to be one of measurement gap patterns with identities 0 to 3 in a case that the master node needs to configure the terminal to perform the E-UTRAN inter-frequency measurement, and further needs to configure a measurement gap for the terminal.

Here, the secondary node is an E-UTRAN node eNB, the master node is a radio access network (RAN) node gNB of the 5G system.

Those of ordinary skills in the art will appreciate that elements and algorithm steps of various examples described in the embodiments disclosed herein may be implemented in electronic hardware or a combination of computer software and electronic hardware. Whether these functions are performed in hardware or software depends on a specific application and design constraints of a technical solution. A person skilled in the art may use different methods to implement described functions for each particular application, but such implementation should not be considered to be beyond the scope of the present disclosure.

A person skilled in the art may clearly understand that for convenience and brevity of the description, a specific working process of the system, the device and the unit described above may be obtained by referring to a corresponding process in the foregoing method embodiments, and details thereof are not described herein again.

In embodiments provided in the present application, it should be understood that the disclosed devices and methods may be implemented in other manners. For example, the device embodiments described above are merely illustrative. For example, the device embodiments described above are merely illustrative. For example, a division of units is only a logical function division. In actual implementation, there may be another division manner, for example, a plurality of units or components may be combined or may be integrated into another system, or some features may be ignored or not be executed. In addition, mutual coupling or direct coupling or communication connection shown or discussed may be an indirect coupling or communication connection through some interfaces, devices or units, and may be in an electrical, mechanical or other form.

Units described as separate components may or may not be physically separated, and the components displayed as units may or may not be physical units, that is, may be located in one place, or may be distributed on multiple network units. A part or all of the units may be selected according to actual needs to achieve the objectives of the solutions of the embodiments of the present disclosure.

In addition, functional units in various embodiments of the present disclosure may be integrated into one processing unit, or each unit may exist physically separately, or two or more units may be integrated into one unit.

If the functions are implemented in the form of software functional units as an independent product for sale or use, the software functional units may also be stored in a computer readable storage medium. Based upon such understanding, the technical solutions of the present disclosure essentially or a part thereof contributing to the prior art may be embodied in the form of a computer software product which may be stored in a storage medium and which includes several instructions to cause a computer device (which may be a personal computer, a server, or a network device, etc.) to perform all or some steps of the measurement gap configuration method according to the respective embodiments of the present disclosure. The foregoing storage medium includes various media that may store program codes, such as a USB flash drive, a mobile hard disk, a ROM, a RAM, a magnetic disk, or an optical disk.

The aforementioned are merely specific implementations of the present disclosure, but the scope of the disclosure is by no means limited thereto. Any modifications or substitutions that would easily occurred to those skilled in the art, without departing from the technical scope disclosed in the disclosure, should be encompassed in the scope of the present disclosure. Therefore, the scope of the present disclosure is to be determined by the scope of the claims.

What is claimed is:

1. A measurement gap configuration method, applied to a New radio-Evolved universal terrestrial radio access-Dual Connectivity (NE-DC) scenario, wherein the method comprises:
   sending, by a secondary node, first indication information to a master node, wherein the first indication information is used to request the master node to configure a measurement gap, or is used to indicate whether the secondary node requests the master node to configure a measurement gap, wherein the secondary node does not indicate any frequency information to the master node.

2. The method according to claim 1, wherein,
   the first indication information is indicated by a predetermined 1-bit, wherein, the first indication information indicates that the secondary node needs to configure the terminal to perform an Evolved-Universal Terrestrial Radio Access Network (E-UTRAN) inter-frequency measurement in a case that a value of the 1-bit is 0, or, the first indication information indicates that the secondary node needs to configure the terminal to perform the E-UTRAN inter-frequency measurement in a case that a value of the 1-bit is 1.

3. The method according to claim 2, wherein the method further comprises:
   sending second indication information to the master node, or abstaining from sending the second indication information to the master node, in a case that the secondary node does not need to configure the terminal to perform the E-UTRAN inter-frequency measurement, wherein the second indication information is used to indicate that the secondary node does not need to configure the terminal to perform the E-UTRAN inter-frequency measurement, or used for not requesting the master node to configure a measurement gap.

4. The method according to claim 3, wherein,
   the second indication information is indicated by a 1-bit, wherein, the second indication information indicates that the secondary node does not need to configure the terminal to perform the E-UTRAN inter-frequency measurement in a case that a value of the 1-bit is 1; or, the second indication information indicates that the secondary node does not need to configure the terminal to perform the E-UTRAN inter-frequency measurement in a case that a value of the 1-bit is 0.

5. The method according to claim 1, wherein, the secondary node is an Evolved-Universal Terrestrial Radio Access Network (E-UTRAN) node eNB, the master node is a radio access network (RAN) node gNB of a 5G system.

6. A communication device, comprising:
   a processor, and a storage storing a computer program, wherein when the computer program is executed by the processor, the processor implements the method according to claim 1.

7. The communication device according to claim 6, wherein,
   the first indication information is indicated by a predetermined 1-bit, wherein, the first indication information indicates that the secondary node needs to configure the terminal to perform an Evolved-Universal Terrestrial Radio Access Network (E-UTRAN) inter-frequency measurement in a case that a value of the 1-bit is 0, or, the first indication information indicates that the secondary node needs to configure the terminal to perform the E-UTRAN inter-frequency measurement in a case that a value of the 1-bit is 1.

8. The communication device according to claim 7, wherein when the computer program is executed by the processor, the processor further implements:
   sending second indication information to the master node, or abstaining from sending the second indication information to the master node, in a case that the secondary node does not need to configure the terminal to perform the E-UTRAN inter-frequency measurement, wherein the second indication information is used to indicate that the secondary node does not need to configure the terminal to perform the E-UTRAN inter-frequency measurement, or used for not requesting the master node to configure a measurement gap.

9. The communication device according to claim 8, wherein,
   the second indication information is indicated by a 1-bit, wherein, the second indication information indicates that the secondary node does not need to configure the terminal to perform the E-UTRAN inter-frequency measurement in a case that a value of the 1-bit is 1; or, the second indication information indicates that the secondary node does not need to configure the terminal to perform the E-UTRAN inter-frequency measurement in a case that a value of the 1-bit is 0.

10. The communication device according to claim 6, wherein, the secondary node is an E-UTRAN node eNB, the master node is a radio access network (RAN) node gNB of a 5G system.

11. A measurement gap configuration method, applied to a New radio-Evolved universal terrestrial radio access-Dual Connectivity (NE-DC) scenario, wherein the method comprises:
    receiving, by a master node, first indication information sent by a secondary node, wherein the first indication information is used to request the master node to configure a measurement gap, or is used to indicate whether the secondary node requests the master node to configure a measurement gap, wherein the master node does not receive any frequency information from the secondary node.

12. The method according to claim 11, wherein subsequent to receiving the first indication information, the method further comprises:
    configuring, by the master node according to the first indication information, a measurement gap pattern of the terminal to be one of measurement gap patterns with identities 0 to 3.

13. The method according to claim 11, wherein,
    the first indication information is indicated by a predetermined 1-bit, wherein, the first indication information indicates that the secondary node needs to configure the terminal to perform an Evolved-Universal Terrestrial Radio Access Network (E-UTRAN) inter-frequency measurement in a case that a value of the 1-bit is 0, or, the first indication information indicates that the secondary node needs to configure the terminal to perform the E-UTRAN inter-frequency measurement in a case that a value of the 1-bit is 1.

14. The method according to claim 11, wherein, the master node is a radio access network (RAN) node gNB of a 5G system, the secondary node is an Evolved-Universal Terrestrial Radio Access Network (E-UTRAN) node eNB.

15. A communication device, comprising:
a processor, and a storage storing a computer program, wherein when the computer program is executed by the processor, the processor implements the method according to claim 11.

16. A measurement gap configuration method, applied to a New radio-Evolved universal terrestrial radio access-Dual Connectivity (NE-DC) scenario, wherein the method comprises:
receiving, by a master node, second indication information sent by a secondary node, wherein the second indication information is used for not requesting the master node to configure a measurement gap, wherein the master node does not receive any frequency information from the secondary node.

17. The method according to claim 16, wherein subsequent to receiving the second indication information, the method further comprises:
configuring, by the master node, a measurement gap pattern of the terminal according to whether the master node needs to configure the terminal to perform an Evolved-Universal Terrestrial Radio Access Network (E-UTRAN) inter-frequency measurement, wherein, the measurement gap pattern of the terminal is configured to be one of measurement gap patterns with identities 0 to 3 in a case that the master node needs to configure the terminal to perform the E-UTRAN inter-frequency measurement, and further needs to configure a measure gap for the terminal.

18. The method according to claim 16, wherein,
the second indication information is indicated by a 1-bit, wherein, the second indication information indicates that the secondary node does not need to configure the terminal to perform an Evolved-Universal Terrestrial Radio Access Network (E-UTRAN) inter-frequency measurement in a case that a value of the 1-bit is 1; or, the second indication information indicates that the secondary node does not need to configure the terminal to perform the E-UTRAN inter-frequency measurement in a case that a value of the 1-bit is 0.

19. The method according to claim 16, wherein, the master node is a radio access network (RAN) node gNB of a 5G system, the secondary node is an Evolved-Universal Terrestrial Radio Access Network (E-UTRAN) node eNB.

20. A communication device, comprising:
a processor, and a storage storing a computer program, wherein when the computer program is executed by the processor, the processor implements the method according to claim 16.

* * * * *